Jan. 19, 1965 J. H. HELFRICH 3,166,734

SIGNAL ASSEMBLER COMPRISING A DELAY LINE AND SHIFT REGISTER LOOP

Filed Dec. 6, 1962 9 Sheets-Sheet 1

INVENTOR
J. H. HELFRICH
BY John K. Mullarney
ATTORNEY

Jan. 19, 1965 J. H. HELFRICH 3,166,734

SIGNAL ASSEMBLER COMPRISING A DELAY LINE AND SHIFT REGISTER LOOP

Filed Dec. 6, 1962 9 Sheets-Sheet 9

3,166,734
SIGNAL ASSEMBLER COMPRISING A DELAY LINE AND SHIFT REGISTER LOOP

John H. Helfrich, Middletown, N.J., assignor to Bell Telephone Laboratories, Incorporated, New York, N.Y., a corporation of New York Filed Dec. 6, 1962, Ser. No. 243,213
12 Claims. (Cl. 340—147)

This invention relates to digital data processing circuits and more particularly to supervisory signal assembler and distributor circuits for use with time division switching systems.

In a typical time division multiplexed message stream, the bits (i.e., binary digits) allotted to carrying signaling information are labeled S-bits. These S-bits or signal bits are located at several predetermined positions in each repetitive "frame" of the multiplexed message stream to form S-characters. Since each S-bit can be either a "1" or "0," a number of unique S-characters can be arrived at, each of which serves to convey a given item of signaling information such as On-hook, Off-hook, Call-waiting, Busy, Cancel and the like.

At the interface between a central switching office and the transmission facility associated with each incoming line or trunk, there must be interposed equipment which can provide necessary compatibility. Thus, for example, from incoming message streams to a central switching office, this equipment must separate S-bits from message and framing bits, assemble the S-bits into S-characters and finally provide for the transfer of these assembled characters to the central processor of the switching office. Conversely, for outgoing message streams from a central switching office, the equipment must provide for the acceptance of S-characters from the central processor, the distribution of the S-characters as S-bits to the terminating line equipment, and finally insertion of the S-bits into the outgoing message bit streams.

Various methods and means have been devised heretofore to implement the S-bit assembly and distribution functions. The known schemes, however, all involve the use of extensive and complex storage equipment.

Because of high costs usually entailed in the use of large capacity stores, considerable effort has been devoted to minimization of the store requirements. Unfortunately, store requirements have not been appreciably reduced without encountering the penalty of substantially increased decision logic.

It is accordingly an object of this invention to circumvent the above dilemma by resorting to dynamic storage techniques for the interchange of supervisory information between a central switching office and subscriber lines, or trunks.

A further object of the present invention is to provide highly flexible yet relatively simple and inexpensive processing circuits for supervisory information interchange.

A supervisory signal assembler constructed in accordance with the principles of the present invention comprises a delay line and a shift register connected end to end in a loop configuration. The total loop delay is selected to achieve precession in the loop. For example, if the S-bits in the incoming message bit stream are located at a preassigned position in alternate sub-frames, a total loop delay equal to the duration of two sub-frames less one delay loop bit spacing will provide the desired precession. Accordingly, if the first S-bit ($S_1$) of an S-character is sampled and introduced into the delay loop, it will circulate around the loop and will reappear at the input one delay loop bit position before the introduction of the next S-bit ($S_2$) of the same S-character. Thus, when the $S_2$ bit is introduced into the delay loop it occupies the subsequent bit position immediately adjacent to the $S_1$ bit.

Precession again takes place as the $S_1$ and $S_2$ bits circulate around the delay loop so that the $S_2$ bit reappears at the input one delay loop bit position before the introduction of the next S-bit ($S_3$). When the $S_3$ bit is introduced into the delay loop it therefore appears immediately adjacent the $S_2$ bit which in turn is adjacent the $S_1$ bit. The process thus described continues until all the S-bits of an S-character have been assembled in proximate bit positions in the delay loop.

The shift register comprises a plurality of stages at least equal in number to the number of S-bits forming the unique S-characters. The S-bits are successively read into the input of the register in the manner described, and a parallel read out from the same is carried out shortly after the last S-bit of each S-character has been read in. The assembled S-characters are then transferred in parallel form to the central processor.

It is a significant feature of the invention that the same delay loop can be used for the assembly of S-characters from a plurality of incoming subscriber lines, and/or trunks. By selecting the proper bit spacing in the delay line loop, a loop capacity can be arrived at for accomodating any given number of incoming lines. All line terminals are scanned for S-bits on a sequential and cyclic basis and these are stored in and read out of the delay loop as heretofore described. Thus, the assembly of a plurality of unique S-characters is carried out more or less simultaneously.

In a further embodiment of the invention, the capacity of the delay loop is increased to accommodate two successive S-characters of each incoming multiplexed message stream. This permits the temporary store of an S-character while the next successive one of the same message stream is assembled. As each new S-character is assembled, it is compared with the previous one, and if different, it is read out to the central processor. If the successive S-characters of a given multiplexed message stream are the same, however, no such read out occurs. Thus the signaling information is effectively screened and the central processor is advised only of changes in the same.

A supervisory signal distributor constructed in accordance with the present invention likewise comprises a precessional delay loop that includes a delay line and a shift register connected end to end in a closed loop configuration. The distributor utilizes the same structure as the assembler heretofore described, but the read in and read out operations are reversed. That is, the S-characters designated for respective outgoing message bit streams, are successively read into the shift register of the delay loop in parallel form, while the read out therefrom is a series or sequential one. The read out may advantageously take place at the input to the delay line.

The various features and objects of the invention may be better understood by a consideration of the following detailed description when read in connection with the drawings in which:

FIG. 1 which is comprised of parts 1A and 1B placed as shown in 1C, is a block diagram representation of a typical time division switching system comprising the time division switching matrix, the line and/or trunk termination circuits, and the supervisory signal assemblers and distributors;

Figure 3:
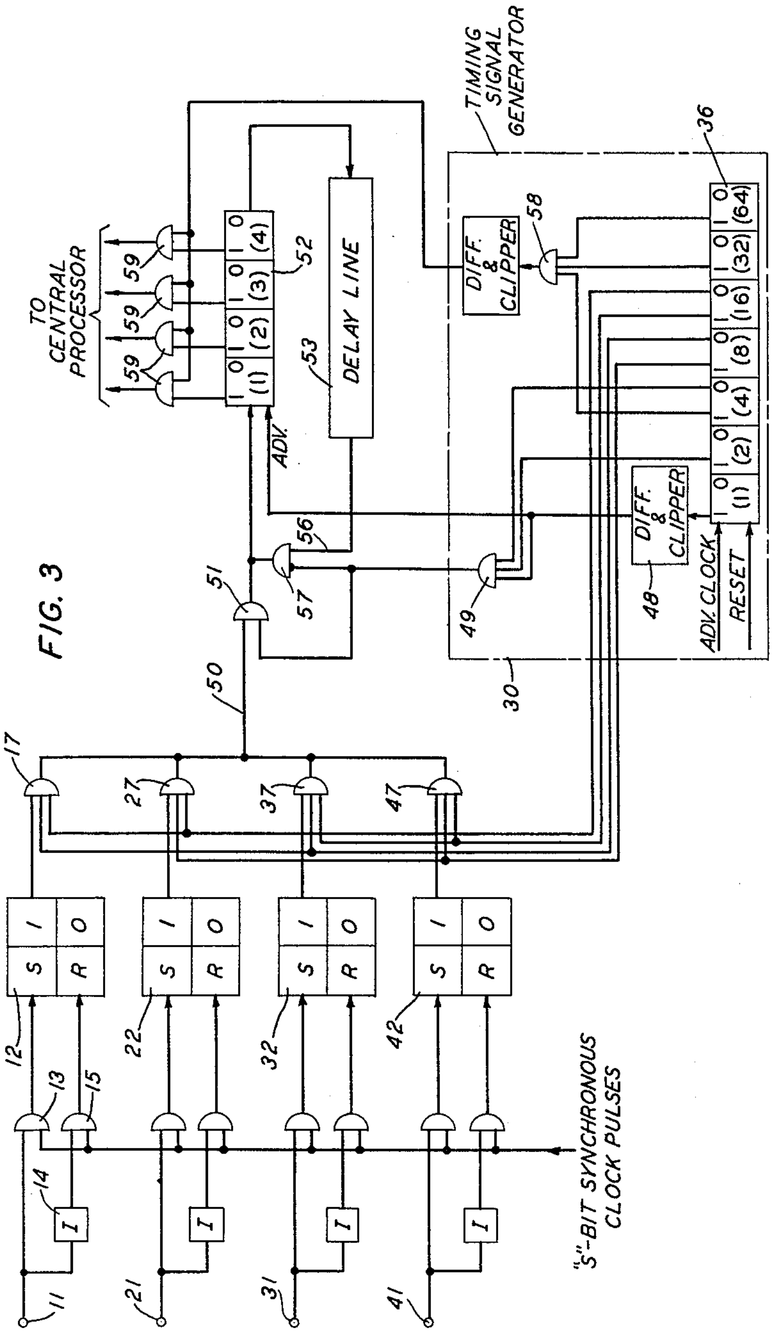
FIG. 3 shows a schematic block diagram of a supervisory signal assembler constructed in accordance with the present invention.
Figure 4A:
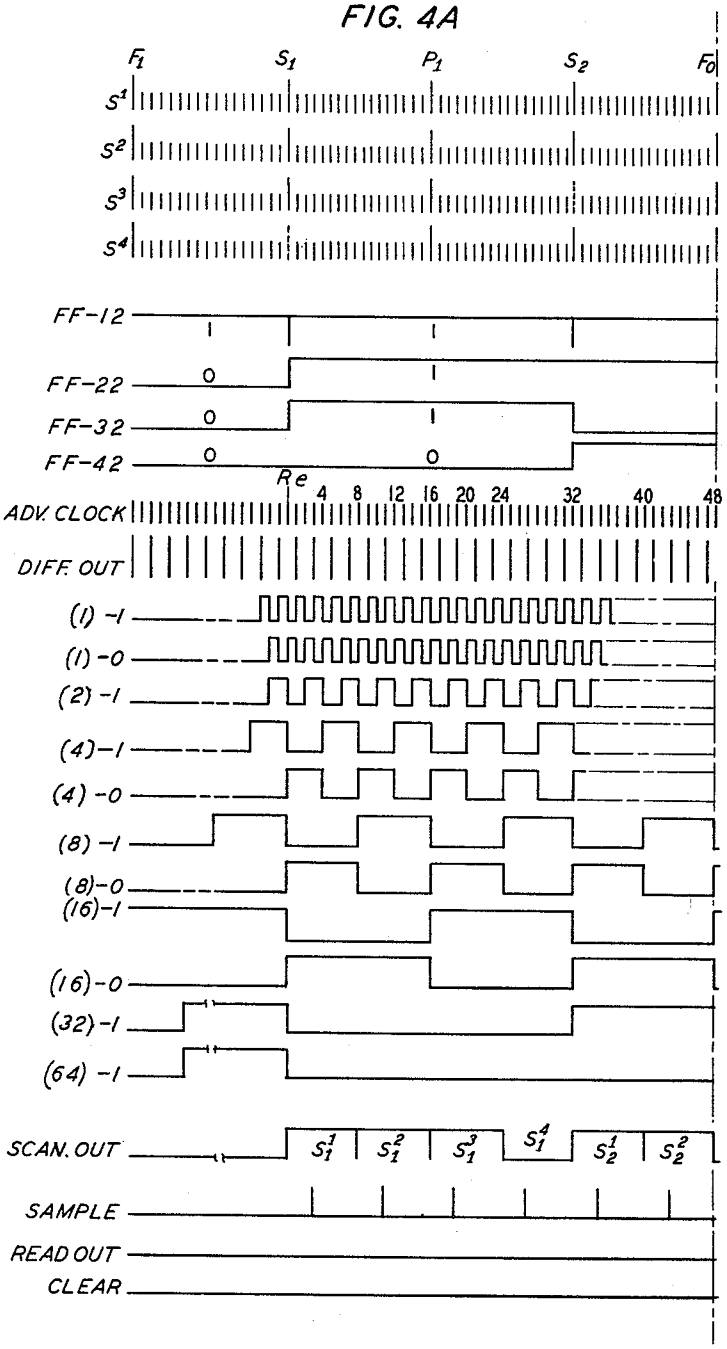
Figure 4C:
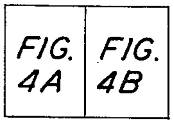
Figure 4B:
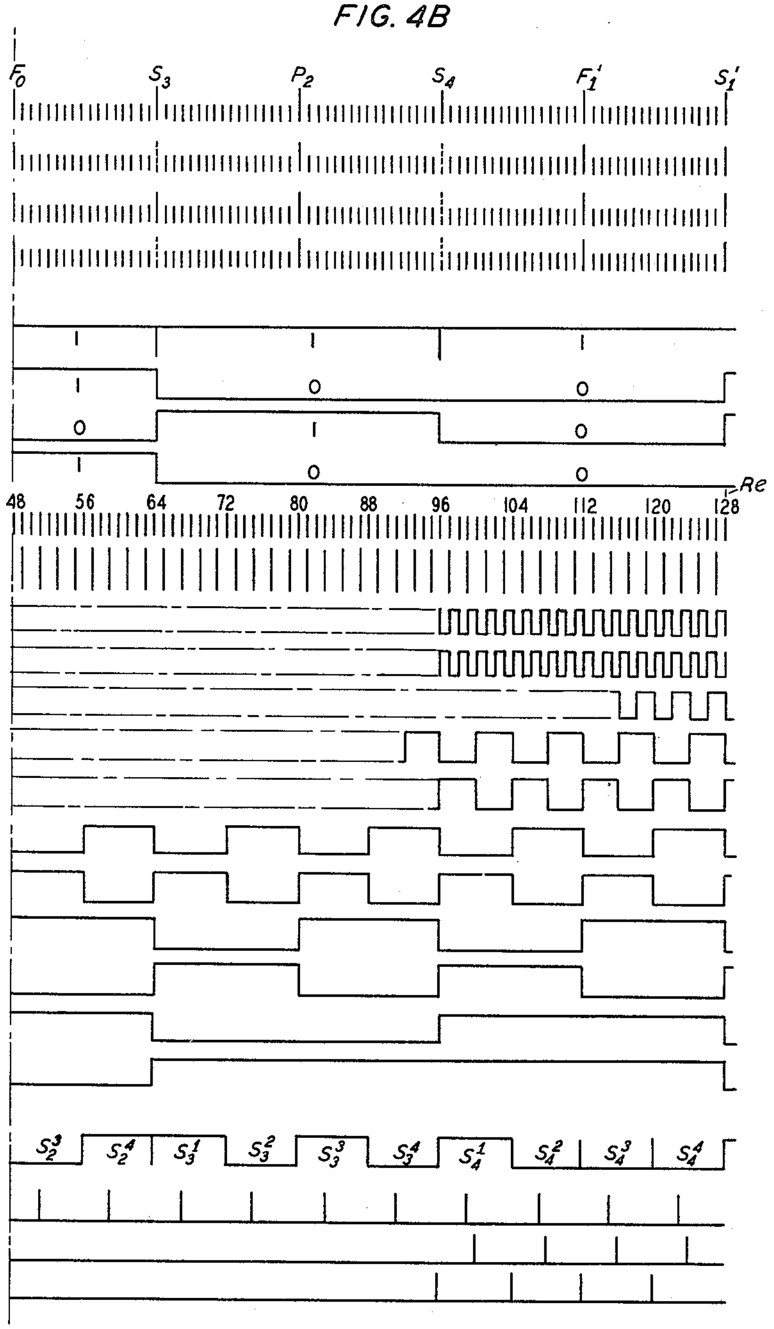
Figure 5:
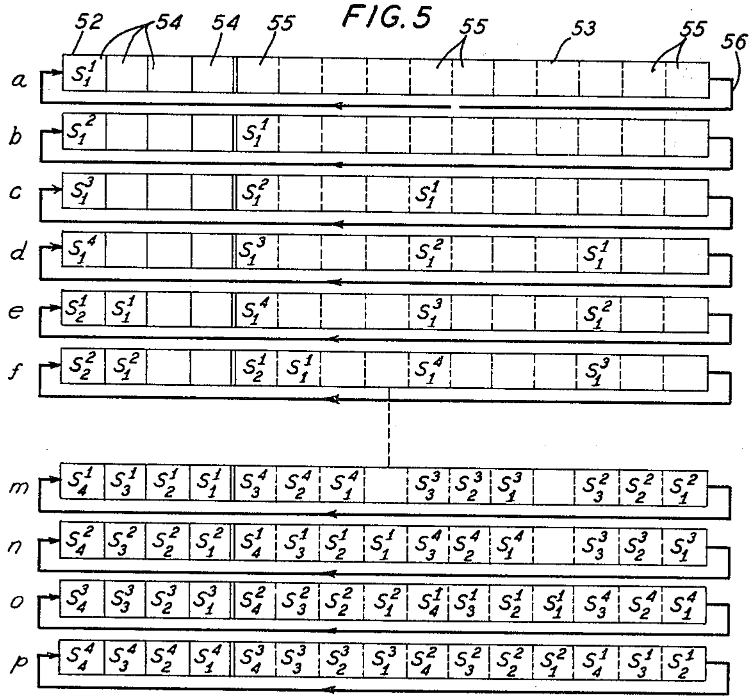
Figure 7:
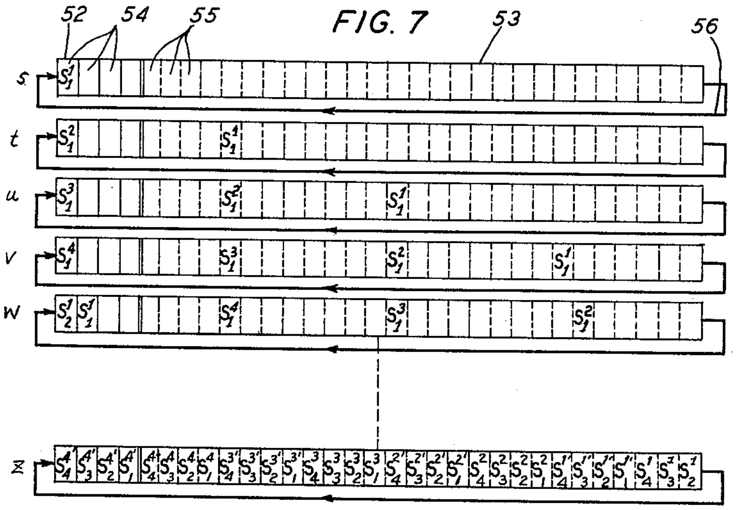
Figure 6:
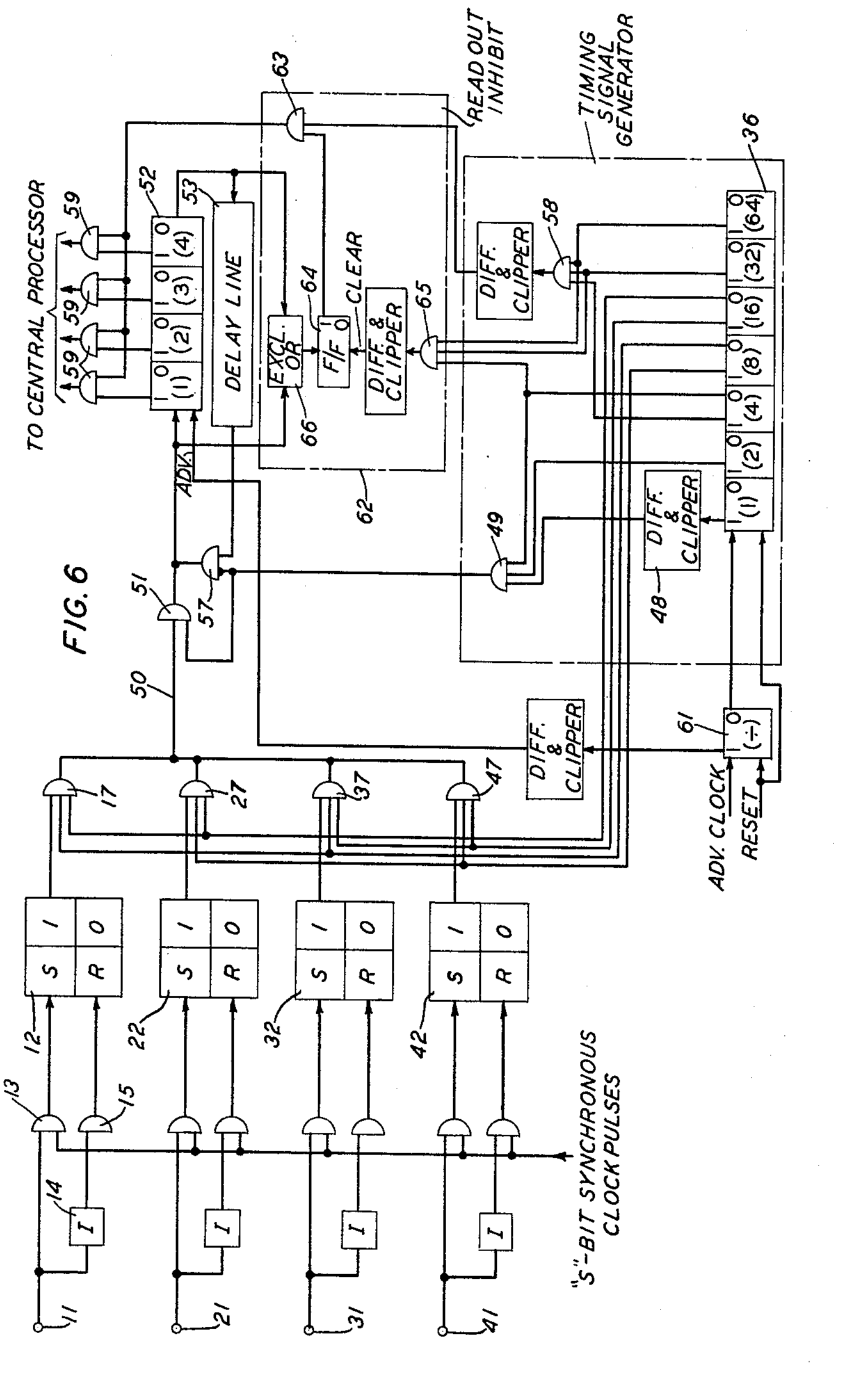
Figure 8:
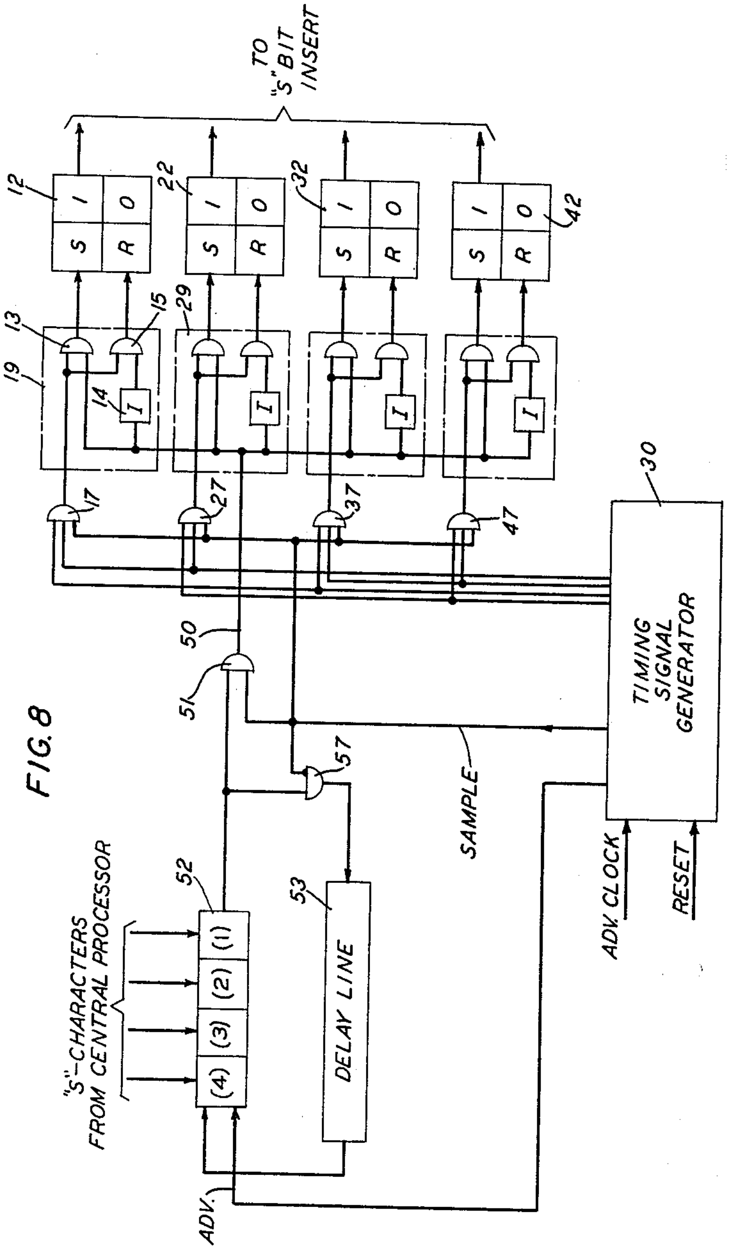
Figure 9:
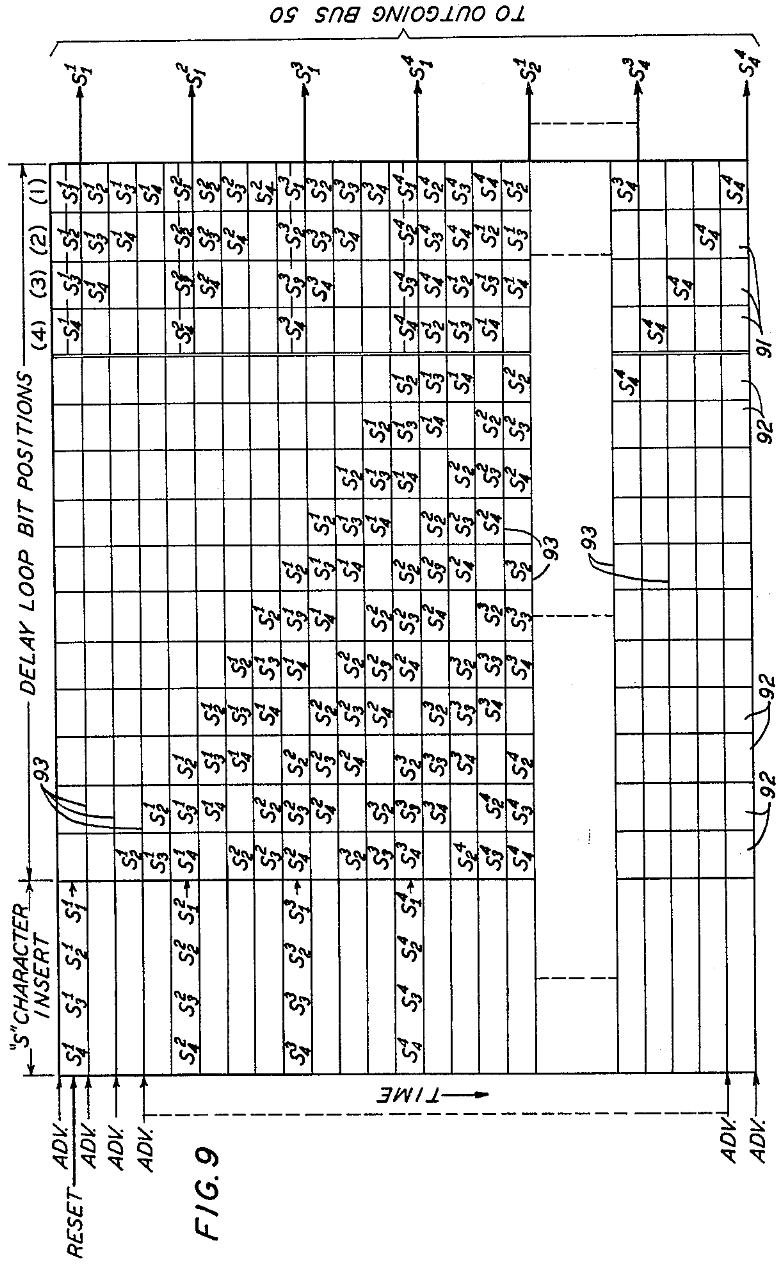

FIG. 4, which is comprised of parts 4A and 4B placed as shown in 4C, illustrates waveforms useful in the explanation of the invention;

FIG. 5 shows a series of diagrams that symbolically illustrate the manner of operation of the delay loop shown in FIG. 3;

FIG. 6 is a modification of the assembler of FIG. 3 wherein successive S-characters of each message bit stream are compared and read out of the same occurs only in response to a change in S-character coding;

FIG. 7 shows a series of symbolic diagrams that illustrate the manner of operation of the delay loop of FIG. 6;

FIG. 8 shows a schematic block diagram of a supervisory signal distributor in accordance with the principles of the present invention; and FIG. 9 is a table useful in the explanation of the distributor of FIG. 8.

Figures 1A, 1C:
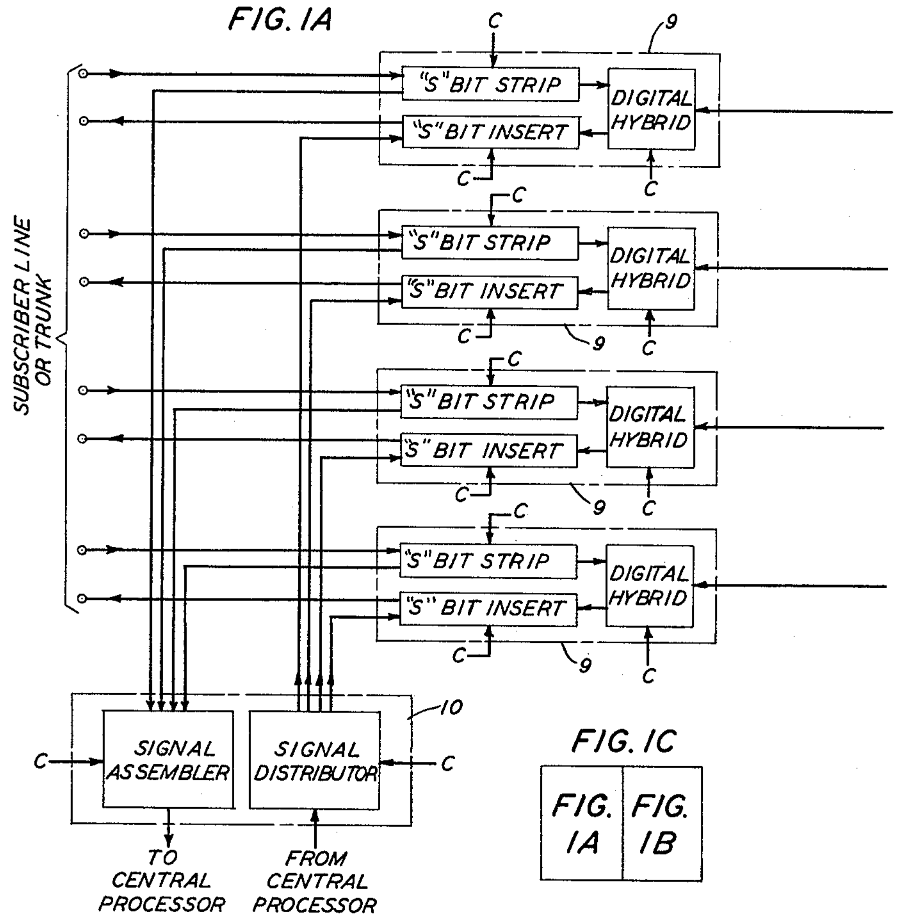
Figure 1B:
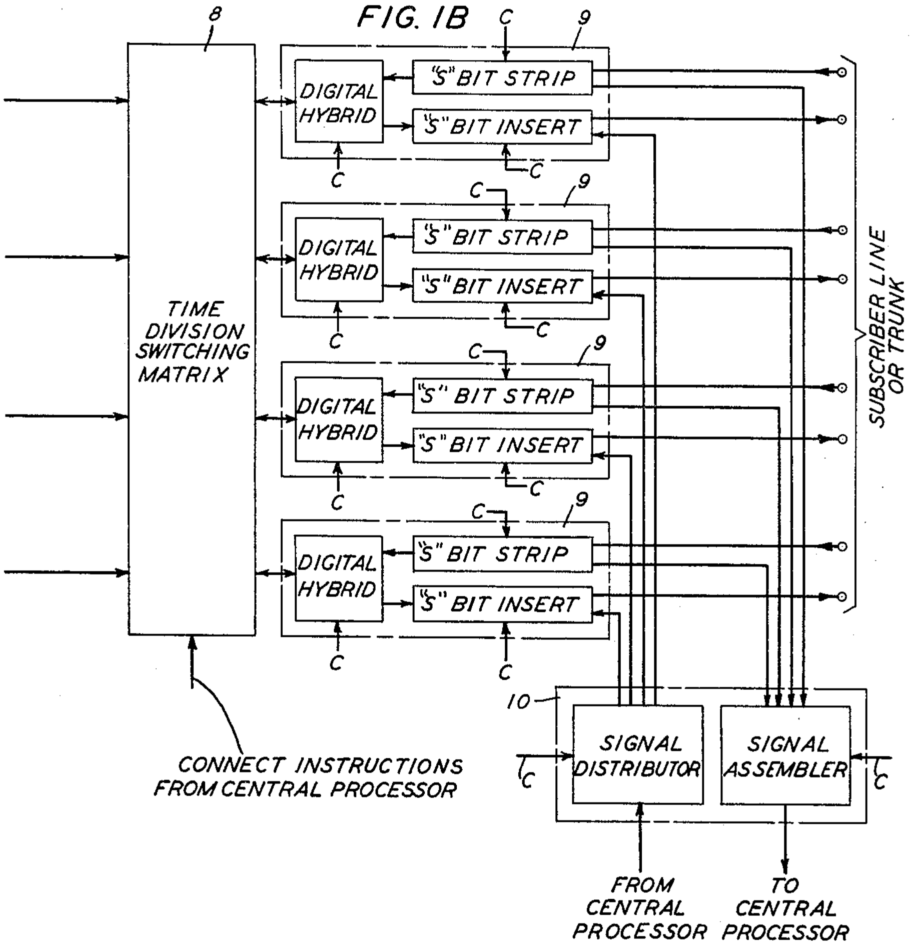

Referring now more specifically to the drawings, there is shown in FIG. 1 a block diagram schematic of an illustrative time division switching system comprising a time division switching matrix 8, line or trunk termination circuits 9 and assembler-distributor subsystems 10. As is known to those in the art, a time division switch (TDS) provides a facility that can multiplex digital messages under the direction of a common control or central processor (not shown). Such systems have the capability of associating any pair of subscribers or trunks and multiplexing a number of subscribers or trunks over a broadband trunk.

In response to instructions received from the central processor, the switching matrix establishes the necessary connections for transferring the message bits of an incoming subscriber line or trunk to a given outgoing subscriber line or trunk.

The time division switch terminal circuits 9 perform three basic functions. They (1) separate the supervisory bits from the message bits in the incoming bit stream, (2) buffer both the message bits preparatory to their being switched through the TDS matrix and the supervisory bits preparatory to their entry into the TDS supervisory signal assembler, and (3) insert into the outgoing stream message bits received through the TDS matrix and supervisory bits received from the TDS supervisory signal distributor.

The digital messages flow both ways; that is, to and from subscriber lines, or trunks. Data arrives from a subscriber in a digital stream containing message and supervision, and each bit is stored, e.g., in a capacitor, in the stripper portion of the TDS terminal circuit for a portion of a bit period. It is then transferred to a separation circuit where, if it is a supervisory bit, it can be stored in one capacitor and, if a message bit, stored in another, again for a fraction of a bit period. The message bit is then transferred, by resonant transfer for example, to a capacitor in the digital hybrid where it awaits its assigned time slot for transfer through the matrix to the hybrid of the receiving subscriber line or trunk. From there it can again be transferred by resonant transfer to the inserter, where it is inserted into the outgoing message bit stream. The control of the stripper and inserter circuits is accomplished by driving the transfer switches with pulses of the proper frequency and phase from a central timing unit (not shown).

The TDS supervisory signal assembler receives supervisory bits from all the strippers and after assembly of the same into respective S-characters it transfers these characters to the central processor. Conversely, the TDS supervisory signal distributor receives S-characters from the central processor and distributes the same as S-bits to the respective inserters.

The foregoing brief description of an illustrative time division switching system is for the purpose of introducing the signal assembler and distributor circuits of the present invention and for showing the interrelationship of the latter with the other units of a time division switch. The signal assembler and distributor circuits of the invention are of general utility and are in no way limited to any specific switching matrix or terminal circuitry, numerous arrangements and various modifications of the latter units being well known to those in the art.

Figure 2:
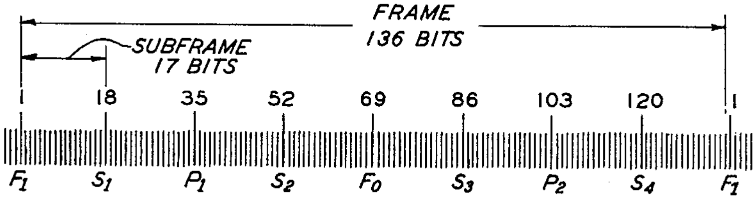
FIG. 2 illustrates a typical message bit stream that is received over a subscriber line or trunk in a cyclic pattern.

FIG. 2 shows the format of a typical digital message stream that is received over a transmission line in a cyclic pattern. In the illustrated case, a cycle of 136 bits, or a frame, contains 128 message bits; 4 supervisory bits $S_1$, $S_2$, $S_3$ and $S_4$ which form a unique S-character; and 4 control bits, $F_1$, $F_0$, $P_1$ and $P_2$. The eight supervisory and control bits are called subframe bits and, for ease and simplicity in processing, these are normally distributed evenly throughout the bit stream, any two adjacent subframe bits being separated by sixteen message bits. The $F_1$ and $F_0$ bits are framing bits, and the $P_1$ and $P_2$ bits may be used for parity check purposes. The message bits can constitute multiplexed message bits from a plurality of subscribers or, alternatively, the message bits of a single subscriber. In either event, the signal assembly and distribution functions are the same.

For illustrative purposes, four incoming and four outgoing subscriber lines will be assumed, over each of which there can appear a digital message bit stream such as shown in FIG. 2. Typically, the digital data of the respective lines will be synchronized with each other under the control of a master synchronizing circuit (not shown) located either at the central office or remotely. For simplicity in presentation such synchronization will be assumed herein. However, as will be clear hereinafter, subscriber line synchronization is not required by the assembler and distributor circuits of the present invention; all that is necessary is that the bit rate and bits per frame be the same for all lines.

Turning now to the supervisory signal assembler of FIG. 3 and the explanatory waveforms of FIG. 4, the S-bits that appear in each of the incoming synchronous message bit streams, designated $S^1$, $S^2$, $S^3$ and $S^4$ in FIG. 4, are stripped therefrom and delivered to input terminals 11, 21, 31 and 41, respectively. Thus, the S-bits of bit stream $S^1$ will be delivered to terminal 11, the S-bits of bit stream $S^2$ to terminal 21, and so on.

The S-bits appearing at the input terminals 11, 21, 31 and 41 are fed to the flip-flops 12, 22, 32 and 42, respectively, via "double rail gate" logic circuits. The operation of these logic circuits is such that an input binary one sets the associated flip-flop to its "1" state, and a binary zero sets the flip-flop to its "0" state. For example, a binary one S-bit at terminal 11 will be applied to the input of AND gate 13 along with a clock pulse from a subframe clock pulse generator (not shown). A typical generator for producing periodic clock pulses that are synchronous with the S-bits in the incoming bit streams is disclosed in the copending application of D. M. Coulter, Serial No. 208,647, filed July 9, 1962. Thus, with the two inputs of AND gate 13 momentarily energized, an enabling signal will be delivered to the set terminal of flip-flop 12 to set the same to its "1" state. If flip-flop 12 was already in the "1" state, it just remains there. Since the input S-bit is inverted in inverter 14, the AND gate 15 remains deenergized at this time.

A binary zero S-bit at terminal 11 fails, of course, to energize AND gate 13; but because of the voltage inversion provided by inverter 14, this binary zero causes an energizing signal to be delivered from AND gate 15 to the reset terminal of flip-flop 12 to set the same to its "0" state.

In the described manner, the flip-flop 12 is continuously set and reset in accordance with the coding of the S-bits in the bit stream designated $S^1$. And in similar fashion the flip-flops 22, 32, and 42 are set and reset in accordance with the S-bit coding of bit streams $S^2$, $S^3$ and $S^4$, respectively.

In response to the applied S-bits, the flip-flops 12, 22, 32 and 42 assume the successive states illustrated by the FIG. 4 waveforms designated FF–12, FF–22, FF–32 and FF–42. Since each of the S-bits of the bit stream $S^1$ is a binary one, the flip-flop 12 will be set to, and remain in, its "1" state (see waveform FF–12). A change in the S-character coding will, of course, alter this flip-flop output. The $S_1$ and $S_2$ bits of message bit stream $S^2$ are assumed to be a binary one, while the $S_3$ and $S_4$ bits are both assumed to be a binary zero, the latter bits thus being illustrated in dotted form. Accordingly, the flip-flop 22 will be set to its "1" state and then to its "0" state on alternate half frames, as illustrated by the waveform FF–22. The derivation of the waveforms FF–32 and FF–42, which are indicative of the successive states of flip-flops 32 and 42, is believed self-evident from the foregoing explanation.

The successive states of each flip-flop therefore correspond to the sequence of S-bits in the message bit stream associated therewith. The assembly of S-bits is thus effectively carried out by sampling the flip-flop outputs, sequentially and cyclically, and delivering the samples to the delay loop for temporary storage.

The sampling of the flip-flop outputs, the read into storage of the same, the parallel read out from storage and various other operations are carried out under the control of the timing signal generator 30. The generator 30 comprises a conventional binary counter 36 and associated logic circuitry. The counter itself consists of seven stages, each of which is designated with a designation in parenthesis indicating the decimal equivalent of the binary stage. Clock pulses from a local clock (not shown) advance the count in counter 36 in a typical step-like manner. The counter thereby normally counts and resets cyclically and in synchronism with the incoming frames.

The input clock pulses to the counter and the output of various counter stages are shown in FIG. 4 of the drawings. The clock pulses are illustrated by the waveform designated ADV. CLOCK. Every stage of the counter has a (1) and (0) output terminal, which are alternately energized. That is, when the (1) output terminal of a stage is energized the (0) terminal is deenergized and vice versa.

When the first clock pulse is applied to stage (1) of the binary counter 36, this stage will be set to its "1" state and will provide an energizing signal at its (1) output terminal. When the second clock pulse is applied to binary counter 36, stage (1) will be set to its "0" state and stage (2) will be set to its "1" state in typical binary fashion. As succeeding clock pulses are applied to binary counter 36, the respective stages will operate in the manner well known in the art.

In FIG. 4 the waveform designated (1)–1 represents the signal that appears at the (1) output terminal of stage (1) in response to successive input clock pulses. The waveform (1)–0 represents the signal at the (0) output terminal of stage (1), and it is, of course, the inverse of the above. Waveform (2)–1 is the signal that appears at the (1) output terminal of stage (2); waveform (4)–1 is the signal at the (1) output terminal of stage (4); and so on.

The subframe clock pulse generator, noted above, delivers a reset pulse to the counter 36 to initiate a cycle of counter operation. This reset pulse is synchronous with the $S_1$ bits of the message bit streams, and the same may be derived, for example, in the manner disclosed in the above-cited Coulter application. The reset pulses are shown inserted in the ADV. CLOCK waveform of FIG. 4; they are labeled "Re."

The flip-flops are scanned sequentially and cyclically using the output of stages (8) and (16) of counter 36 and the AND gates 17, 27, 37, and 47. For example, the (1) output lead of counter 12 is connected to the input of AND gate 17. The input of this AND gate is also connected to the (0) output terminals of the stages (8) and (16) of the counter. Accordingly, the state of the flip-flop 12 will be read out to the common bus 50 each time the (0) output terminals of stages (8) and (16) are energized. Turning now to FIG. 4 and particularly to the waveforms designated (8)–0 and (16)–0, it will be seen that the (0) output terminals of the stages (8) and (16) are both energized once every other subframe (i.e., once in each of the periods separating successive S-bits). Thus, if the flip-flop 12 is in its "1" stage during a scan (i.e., when the (0) output terminals of stages (8) and (16) are energized) a corresponding signal will be read out to the common bus 50. However, if the flip-flop 12 should happen to be in its "0" state, no AND gate output occurs and this, of course, is indicative of the "0" state of the flip-flop.

The AND gate 27 is connected at its input to flip-flop 22, to the (1) output terminal of counter stage (8), and to the (0) output terminal of counter stage (16). Thus, read out of the flip-flop 22 occurs once every other subframe during the period that the (1) output terminal of stage (8) and the (0) output terminal of stage (16) are energized. It will be seen from the waveforms of FIG. 4 that this read out follows the read out of flip-flop 12.

In similar fashion, the read out of flip-flop 32 occurs during the period that the (0) output terminal of stage (8) and the (1) output terminal of stage (16) are energized; and, the read out of flip-flop 42 occurs during the period that the (1) output terminals of counter stages (8) and (16) are energized. The flip-flops are thus scanned sequentially and cyclically to thereby provide a multiplexed signal on bus 50 such as that shown by the waveform of FIG. 4 designated SCAN-OUT. Since the output of the flip-flops is representative of the S-bit coding of the respective message bit streams, the multiplexed pulse signals of the latter waveform are given their appropriate S-bit designation. Thus, the first multiplexed pulse signal on bus 50 corresponds to the coding of the $S_1$ bit of bit stream $S^1$; the next succeeding multiplexed pulse on bus 50 is indicative of the coding of the $S_1$ bit of bit stream $S^2$; the next pulse is representative of the $S_1$ bit of bit stream $S^3$; and the next pulse is representative of the $S_1$ bit of bit stream $S^4$, which in this case is a binary zero. Thereafter, the scanning recycles and signals indicative of the $S_2$ bits of each bit stream are multiplexed onto bus 50; and so on.

The (1) output of counter stage (1) is differentiated and the negative-going spikes are removed in the differentiator-clipper 48. Thus, a short duration positive-going pulse signal is provided at the output of the differentiator-clipper 48 each time the counter stage (1) is set to its "1" state. This short duration pulse signal is, therefore, generated for every other input ADV. CLOCK pulse, as indicated by the FIG. 4 waveform designated DIFF. OUT.

The AND gate 49 is connected at its input to the differentiator-clipper 48, the (1) output terminal of counter stage (2), and the (0) output terminal of stage (4). Thus, the AND gate 49 passes the aforementioned positive-going pulse signals during those periods that the (1) output terminal of stage (2) and the (0) output terminal of stage (4) are energized. The output of AND gate 49 is illustrated by the FIG. 4 waveform designated "SAMPLE." As the name implies, the short duration output pulses from AND gate 49 sample the multiplexed pulse signals appearing on common bus 50 (compare waveforms SCAN-OUT and SAMPLE). To this end, the output pulses of gate 49 are fed to the input of AND gate 51 along with said multiplexed pulse signals. The sampled signal bits are then delivered to the input of the dynamic storage means for temporary storage therein.

The dynamic storage unit comprises a four stage shift register 52 and a delay line 53 connected end to end in a loop configuration, i.e., the output of the shift register is connected to the input of the delay line and the output of the delay line is connected to the input of the register. The delay line may be of any of the types known in the art, e.g., distributed parameter, magnetostrictive or ultrasonic.

The short duration pulse signals from the differential-clipper 48 are applied to the shift register 52 to advance or shift the information stored therein. The shift register is advanced at a rate four times the rate of read in of the sampled bits (compare the pulses of the waveform DIFF. OUT with the pulses of the waveform SAMPLE). Accordingly, a bit will be read out of the register, into the delay line, simultaneously with the insertion of a new bit into the register.

Taking into account the shift rate and the delay line length, the total delay in the delay loop should be such as to provide precession in the loop. For example, for the assumed message bit stream format, a total loop delay equal to the duration of two sub-frames less one bit spacing in the loop will provide the desired precession. Accordingly, if the first S-bit of an S-character (e.g., $S_1^1$) is sampled and introduced into the delay loop, it will circulate around the loop and will reappear at the input one delay loop bit position before the introduction of the next S-bit of the same S-character ($S_2^1$). Thus, when the $S_2^1$ bit is introduced into the delay loop it occupies a bit position immediately adjacent the $S_1^1$ bit. Precession again takes place as the $S_1^1$ and $S_2^1$ bits circulate around the delay loop so that the $S_2^1$ bit reappears at the input one delay loop bit position before the introduction of the next S-bit of the S-character ($S_3^1$). When the $S_3^1$ bit is introduced into the delay loop it therefore appears immediately adjacent the $S_2^1$ bit which is in turn adjacent the $S_1^1$ bit. This process continues until all the S-bits of the S-character are assembled in proximate bit positions in the delay loop; the S-character is then read out in parallel form.

As will be clear from FIG. 5, the described assembly operation is carried out simultaneously for each of the incoming message bit streams using the same delay loop. The delay loop and the manner of operation of the same are symbolically illustrated in FIG. 5. The first four bit positions 54 represent the four stages of the shift register 52, while the remaining eleven positions 55 represent the storage capacity of the delay line in terms of bit positions. Thus, the delay line is of a length such as to provide a total delay equal to eleven shift-pulse periods. The output of the delay line is fed back to the input of the shift register via feedback path 56.

In diagram *a*, the first S-bit ($S_1$) of the bit stream $S^1$ has been inserted into the input stage of the shift register. As described heretofore, the shift register is shifted at a rate four times the rate of read in of the sampled bits and thus the $S_1^1$ bit will be read out of the register, into the delay line, simultaneously with the insertion of the next bit ($S_1^2$) on bus 50 into the register (see diagram *b*). This new bit, of course, represents the first S-bit of the bit stream $S^2$. In the diagrams *c* and *d* the stored bits are advanced four bit positions for each new S-bit insertion (i.e., $S_1^3$ and $S_1^4$). Considering now the diagram *e* of FIG. 5, the $S_1^1$ bit circulates around the delay loop and reappears at the input to the shift register one bit position before the introduction of the next sampled bit, which is the second S-bit ($S_2$) of bit stream $S^1$. Stated somewhat differently, if the stored bits are advanced four bit positions for each new S-bit insertion, the $S_1^1$ bit will be shifted to the second stage of the shift register simultaneously with the insertion of the $S_2^1$ bit. All of the stored bits are once again advanced four bit positions as the next sampled S-bit ($S_2^2$) is introduced into the register (see diagram *f*).

With the insertion of the $S_4^1$ bit into the register the previously stored bits will be in the bit positions shown in diagram *m*, and assembly of a complete S-character is thus complete.

The read out operation then takes place, as will be described hereinafter.

The next bit to be inserted into the delay loop is the $S_4$ bit of bit stream $S^2$, which completes the assembly of the S-character of bit stream $S^2$ (see diagram *n*). In similar fashion the S-characters of bit streams $S^3$ and $S^4$ are assembled, and the process thereafter repeats and assembly of the next succeeding S-character of each message bit stream begins.

As indicated in diagram *o* of FIG. 5, with the insertion of the $S_4^3$ bit into the delay loop the latter is filled to capacity. From this point on each new bit to be inserted must displace or supplant a previously stored bit. For example, in diagram *p* the $S_4^4$ bit is inserted into the delay loop in the position previously occupied by the $S_1^1$ bit. However, in each instance, the displacement of an S-bit is preceded by the read out of the same as part of an S-character. Accordingly, no usable information is destroyed in this displacement.

The inhibit gate 57 of FIG. 3 accomplishes the aforementioned bit displacement. The output of the delay line 53 is normally delivered to the input of the shift register 52 via the gate 57, except when a sampled S-bit is to be inserted into the register. To this end, the sampling pulses that are delivered to the sampling AND gate 51 are also fed to the inhibit input of gate 57. Thus, gate 57 is inhibited each time that gate 51 is energized and any S-bit previously circulating at this time is prevented from recirculating by the action of this inhibit gate.

If the delay line is subject to minor variations in delay it may be best to inhibit the gate 57 over a short period of time which "straddles" the sampling pulse from gate 49. To this end, the inhibit signal to gate 57 could instead be derived from an AND gate (not shown) whose input is connected to the (1) output terminal of stage (2) and the (0) output terminal of stage (4) of counter 36.

The read out signals are derived from AND gate 58, whose input is connected to the (1) output terminals of stages (4), (32) and (64) of counter 36. The output of this gate is differentiated and clipped, as heretofore described, and the derived positive-going pulses are applied to the AND gates 59. The read out pulses comprise the FIG. 4 waveform designated READ OUT. Comparing this waveform and the waveforms designated (4)–1, (32)–1 and (64)–1, it will be seen that a read out pulse is produced for each positive-going transient of waveform (4)–1 that occurs during the period that the (1) output terminals of stages (32) and (64) are energized. As indicated by the waveforms SAMPLE and READ OUT, the read out operation occurs shortly after the sampling and insertion of each $S_4$ bit into the delay loop. It will be recalled that assembly of each unique S-character is accomplished upon the insertion of each $S_4$ bit.

The AND gates 59 are connected to the (1) output terminals of the four stages of register 52. Thus, with the completion of assembly of an S-character, a parallel read out of the same takes place and the S-character is delivered to the central processor.

Referring to FIGS. 3 and 5 of the drawings, it should be clear that the shift register 52 may comprise more than four stages. This, of course, would result in a corresponding reduction in the bit position storage capacity of the delay line. In fact, for the assumed number of incoming bit streams it would undoubtedly be less expensive to provide a recirculating shift register of fifteen bit positions (i.e., fifteen stages) rather than the combined register and delay line combination shown. However, for a large number of incoming bit streams (e.g., 136 at a 40.8 kb. rate) economy calls for the use of a delay line and shift register combination such as that disclosed.

The length of the delay line will depend upon a number of factors such as the number of incoming subscriber lines and the bit rate of the same, the number of shift register stages, the practicable bit spacing in the line, and the like. The only rigid requirement in this regard is that the total loop delay be such as to assure precession in the loop.

The desired precession was achieved in the described case by providing a total loop delay equal to the duration of two sub-frames less one bit spacing. It will be clear, however, to those in the art that precession can also be achieved with a total loop delay equal to the duration of two sub-frames plus one bit spacing. The assembly operation is exactly the same as heretofore described, the only difference being in the order of the S-bits assembled in the register. This order is the reverse of that shown in diagrams *m* through *p* of FIG. 5. That is, the bits of each assembled S-character will be arranged in the register in an ascending order such as $S_1$, $S_2$, $S_3$, $S_4$.

Furthermore, as indicated above, the message bit streams need not be frame or even sub-frame synchronized with each other for operation of the assembler of the present invention. All that is necessary in this regard is that the message streams be bit synchronous with each other and the frame rate and bits per frame be the same for all lines. Minor modification of the flip-flop read in circuitry would be necessitated, but the flip-flop sampling, the read in to the register, and the advance and precession of the bits in the delay loop can be carried out the same as heretofore described. The read out operation similarly occurs shortly after each $S_4$ bit insertion into the loop, but since the latter may occur in some staggered fashion, the read out pulses would most likely not be derived from a single counter unit as described. Individual line "framers" such as disclosed in the aforementioned Coulter application may, for example, be used to provide the necessary read out pulses. The use of such additional equipment on a per line basis can be justified by the fact that line frame synchronization and the equipment required to establish and maintain the same may be eliminated.

Referring now to FIG. 6 of the drawings, there is shown a modification of the FIG. 3 assembler wherein successive S-characters of each message bit stream are compared and read out of the same occurs only in response to a change in S-character coding. The read in to the flip-flops 12, 22, 32 and 42, the scanning of the same, the bit sampling and insertion of the samples into the delay loop, et cetera, all take place as heretofore described. Accordingly, only the points of departure of the FIG. 6 circuit will be covered.

In the circuit of FIG. 6, the capacity of the delay loop is increased to accommodate two successive S-characters of each incoming multiplexed message bit stream. This increased capacity is achieved herein by increasing the shift rate of register 52 which effectively reduces the time slot or bit spacing of the stored bits within the loop. If the bit spacing of the stored bits is reduced by half, for example, then twice as many bits can be stored in a given delay loop. However, as with the previously described precessional assembler, the delay loop must be one time slot or bit position short of (or longer than) a double subframe interval so that S-bits are advanced (or retarded) one bit position during each loop circulation, i.e., the S-bits precess as previously described.

The sampling of the S-bit takes place at the same rate and in the same manner as in the FIG. 3 circuit, but the shift rate of register 52 is doubled. To this end, clock pulses at a rate twice the FIG. 3 clock pulse rate are applied to the input of the divider stage 61. This stage may comprise a typical binary counter stage and hence an output pulse signal will be derived therefrom and delivered to the counter 36 for every other input clock pulse (i.e., stage 61 divides by two). The (1) output of stage 61 is differentiated and clipped, in the manner described heretofore, and the derived short duration positive-going pulse signals are fed to the shift register 52 to advance or shift the data bits stored therein. From the foregoing it should be clear that the counter 36 counts and recycles at the same rate as in FIG. 3, but the shift rate of the register 52 has now been doubled. The shift register is, therefore, advanced in this embodiment at a rate eight times the rate of read in of the sampled bits.

The delay loop and the manner of operation of the same are symbolically illustrated in the diagrams of FIG. 7. Here again, the first four bit positions 54 represent the four stages of the shift register, while the remaining positions 55 represent the storage capacity of the delay line in terms of bit positions. The bit spacing in this delay loop is half that of the FIG. 3 arrangement as a result of the increase in shift rate, thus effectively doubling the delay loop bit capacity. The total delay offered by the loop is here again, equal to a double subframe interval $\pm 1$ bit spacing.

In diagram *s* of FIG. 7, the first S-bit ($S_1$) of the bit stream $S^1$ has been inserted into the input stage of the shift register. The shift register is shifted at a rate eight times the rate of read in of the sample bits and thus the $S_1^1$ bit will appear at the position shown in diagram *t* when the next sampled bit ($S_1^2$) is inserted into the register. In diagrams *u* and *v*, the stored bits are advanced eight bit positions for each new S-bit (i.e., $S_1^3$ and $S_1^4$) insertion. In diagram *w* the stored bits are again shifted eight delay loop bit positions and hence the $S_1^1$ bit will be shifted into the second stage of the shift register simultaneously with the insertion of the next sampled bit ($S_2^1$). The $S_2^1$ bit is thereby placed immediately adjacent the $S_1^1$ bit and the assembly operation thus begins.

The insertion of the $S_4^1$ bit into the register completes the assembly of an S-character of message bit stream $S^1$. However, because of the increased capacity in this precessional delay loop, assembly of the next succeeding S-character of the same message bit stream takes place immediately adjacent the preceding character, as illustrated in diagram *z*. For example, the inserted $S_4^1$ bit will circulate around the delay loop and be shifted into the second stage of the shift register simultaneously with the insertion into the first stage of the sampled bit ($S_1^{1\prime}$) of bit stream $S^1$. As indicated in the $S^1$ waveform of FIG. 4, the $S_1^{1\prime}$ bit represents the $S_1$ bit of the next succeeding S-character of bit stream $S^1$. Thereafter, the assembly of this next succeeding S-character is carried out in the manner explained above. Thus, each S-character is assembled as described, and each assembled S-character occupies a position immediately behind the preceding S-character of the same bit stream, as shown in diagram *z*. The S-characters are eventually displaced by means of inhibit gate 57; however, in each instance, the displacement of an S-character is preceded by a logical comparison between it and the succeeding S-character of the same bit stream.

The logical comparison of successive S-characters is carried out by the read out inhibit circuit 62. This read out inhibit serves to compare each newly assembled S-character with the previously assembled character of the same bit stream and if they are different, the new character is read out to the central processor. If the successive S-characters of a given message bit stream are the same, however, no such read out occurs. The signaling information is thus screened and the central processor is only advised of changes in the same.

The read out pulses that are derived from the AND gate 58, in the manner described hereinbefore, are delivered to the read out AND gates 59 via the AND gate 63. The other input to AND gate 63 is derived from the (1) output terminal of flip-flop 64. Accordingly, with the flip-flop 64 set to its "1" state, the gate 63 will be energized to pass the read out pulses; whereas with the flip-flop set in its "0" state, no read out pulses are passed by gate 63.

A "clear" or reset signal is delivered to the flip-flop 64 a predetermined time period before the insertion of an $S_4$ bit into the delay loop. The insertion of an $S_4$ bit, it will be recalled, completes the assembly of an S-character. Further, the insertion into the register 52 of each $S_4$ bit will be preceded by the reintroduction into the register of the circulating $S_1$, $S_2$ and $S_3$ bits of the same S-character.

The clear signal is delivered to the flip-flop 64 just prior to the reintroduction into the shift register of the circulating $S_1$ bit of the new S-character. This clear signal is derived from AND gate 65 which is coupled at its input to the counter 36 in the manner shown in FIG. 6. Now as the $S_1$ bit is reinserted into the four stage register 52, the $S_1$ bit of the preceding S-character of the same bit stream is shifted out. The exclusive-Or circuit 63 is connected at its input to the input and output terminals of the shift register 52. Exclusive-Or circuits are well known in the art and they serve essentially as matching circuits. Thus, if the two inputs thereto are the same no output signal results, and conversely if the inputs are different an output signal is provided thereby. Accordingly, if the $S_1$ bits being simultaneously read into and out of the shift register are different, the exclusive-Or circuit 66 will deliver an energizing signal to the flip-flop 64 to set the same to its "1" state.

In a similar fashion the circulating $S_2$ and $S_3$ bits which are reintroduced into the register and the $S_4$ bit which is inserted into the register for the first time are successively compared with the $S_2$, $S_3$ and $S_4$ bits, respectively, of the preceding S-character of the same bit stream. Accordingly, if any one of the S-bits of a newly assembled S-character is different from the corresponding bit of the preceding S-character of the same bit stream, an energizing signal will be fed from the exclusion-Or circuit 66 to flip-flop 64 to set the same to its "1" state. If the compared S-characters are the same, however, the flip-flop 64 will remain in its "0" state. The flip-flop, once set, remains set until the next clear signal. The clear signals are illustrated in the FIG. 4 waveform designated CLEAR.

Summarizing the above operation, the coding of successive S-characters of the same bit stream are compared by means of the exclusive-Or circuit 66. The flip-flop 64 will normally remain in its "0" state, thereby preventing the delivery of read out pulses to the AND gates 59 via gate 63. However, upon a change in S-character coding, the exclusive-Or gate will deliver an energizing signal to the flip-flop 64 to set the same to its "1" state. An enabling signal will therefore be fed to gate 63 permitting the same to pass a read out pulse. The flip-flop is then once again reset prior to the next read out pulse, and the operation is repeated as described.

Referring now to FIG. 8 of the drawings, wherein parts corresponding to parts of FIG. 3 are correspondingly numbered, the delay loop here again comprises a shift register 52 and a delay line 53 connected end to end in a loop configuration. The criterion for over-all loop delay is likewise the same, i.e., a double sub-frame interval ±1 bit spacing in the loop. In fact, except for a reversal of the read in and read out operations, the structure and timing relationships of the FIG. 8 distributor are substantially the same as in the assembler of FIG. 3. Accordingly, only the points of departure of FIG. 8 will be considered in detail.

The mode of operation of the distributor of FIG. 8 can be best understood by reference to the table illustrated in FIG. 9 of the drawings. In this table the vertical columns designate bit positions in the delay loop; the columns 91 represent the bit positions offered by the shift register, while the remaining columns 92 represent the storage capacity of the delay line 53 in terms of bit positions. The horizontal lines 93 correspond symbolically to the delivery of advance or shift pulses to the shift register. Accordingly, each stored bit is shown shifted to the right and then read out or recirculated in the loop as successive advance pulses, symbolically represented by lines 93, are delivered to the shift register.

As in the assembler of FIG. 3, a cycle of operation is initiated herein with the delivery of a reset signal to the counter of the timing signal generator circuit 30. The reset signal is shown on the "time" ordinate of the FIG. 9 table as lying between two advance pulses, thus corresponding to the location of the same in FIG. 4. Simultaneous with the reset of the counter of the timing signal generator, the first S-character ($S_4^1$, $S_3^1$, $S_2^1$, $S_1^1$) is read into the shift register in parallel form. As indicated in FIG. 9, the $S_1^1$ bit is inserted into stage (1) of register 52, the $S_2^1$ bit is deposited in stage (2) and so on. The advance or shift pulse which follows the reset signal serves to shift these stored bits one bit position to the right. However, the first sampling pulse occurs herein simultaneous with this advance pulse and hence the $S_1^1$ bit which is advanced out of the register is delivered to the outgoing bus 50 via the enabled AND gate 51. The gate 57 is simultaneously inhibited, as heretofore described, and the $S_1^1$ bit is thereby prevented from recirculating in the delay loop. This operation is illustrated symbolically in FIG. 9, the $S_1^1$ bit being indicated as having been read out with the $S_4^1$, $S_3^1$ and $S_2^1$ bits shifted one bit position to the right.

The next advance pulse again shifts the stored bits one bit position with the result that the $S_2^1$ bit is read out of the register and into the delay line 53 via the gate 57. In FIG. 9, the $S_2^1$ is shown shifted into the extreme left-hand bit position, which of course corresponds to the input of the delay line. This bit thereafter moves through the line at a rate corresponding to the shift rate. With successive shift pulses, the $S_3^1$ and $S_4^1$ bits will be shifted into the delay line and they will then proceed to traverse the length of the line, traveling as shown in FIG. 9 from left to right.

One half of an advance pulse period after the $S_4^1$ bit is read out of the register and into the delay line, the next S-character ($S_4^2$, $S_3^2$, $S_2^2$, $S_1^2$) will be read into the shift register. The next succeeding advance pulse then serves to shift the $S_1^2$ bit out of the register and since another sampling pulse occurs at this time, the $S_1^2$ bit will be delivered to the outgoing bus 50. As in the assembler of FIG. 3, a sampling pulse occurs once for every fourth advance pulse, i.e., the shift register is advanced at a rate four times the sampling bit rate.

The mode of operation depicted in FIG. 9 should be clear at this point. The stored bits advance to the right at a rate corresponding to the shift rate. A sample pulse occurs for every fourth advance pulse and the bit that is in stage (1) of the register at that time is read out onto the outgoing bus 50. S-character read in takes place at the instants indicated in FIG. 9. After the insert of the last S-character ($S_4^4$, $S_3^4$, $S_2^4$, $S_1^4$) into the register the bits circulate around the delay loop as explained. The stored bits precess with respect to the uniform sampling rate, and therefore the bits will be successively read out as indicated. Thus, the illustrated read out of the $S_1$ bits is followed by a similar read out of the $S_2$ bits of each S-character; the $S_3$ and $S_4$ bits are in turn similarly read out. Following the read out of the last stored bit ($S_4^4$), another reset signal will be fed to the counter of the timing signal generator 30 and simultaneously therewith the next succeeding S-character of bit stream $S^1$ will be inserted into register 52, and the described operation will thence repeat.

The AND gates 17, 27, 37 and 47 are connected to the counter of the timing signal generator 30 in exactly the same manner as in FIG. 3. Accordingly, these gates are sequentially and cyclically enabled every double sub-frame interval. The sample pulses fed to the sampling gate 51 are also delivered to the input of these AND gates and, therefore, the sample pulses will be sequentially and cyclically routed to the respective output leads of AND gates 17, 27, 37 and 47.

The output of each AND gate 17, 27, 37 and 47 is fed to a "double rail gate" logic circuit such as described heretofore. The sampled S-bits on bus 50 are also coupled to each of these logic circuits. Accordingly, when the $S_1^1$ bit, for example, is read out of the register 52 onto bus 50, the associated sampling pulse will be routed through the AND gate 17 to the output lead of the latter. The $S_1^1$ bit is thus fed to the flip-flop 12 via one of the AND gates of the logic circuit 19. If this S-bit is a binary one it will be delivered to the set terminal of flip-flop 12 to set the same to its "1" state; whereas if the $S_1^1$ bit is binary zero it will be routed via the inverter 14 and AND gate 15 to the reset terminal to thereby set the flip-flop 12 to its "0" state.

In similar fashion, the $S_1^2$ bit appears on bus 50 concurrently with the appearance of the next sampling pulse on the output lead of AND gate 27. Thus, the $S_1^2$ bit will be fed to the flip-flop 22 via the logic circuit 29. The $S_1^3$ bit is in the same manner coupled to the flip-flop 32, and the $S_1^4$ bit is sent to flip-flop 42. The enabling of the AND gates 17, 27, 37 and 47 thereafter recycles and the $S_2$ bits of the respective S-characters are routed to their respective flip-flops, and so on for the $S_3$ and $S_4$ bits.

Similar to the FIG. 3 assembler arrangement, each flip-flop of the FIG. 8 distributor is associated with a given message bit stream. Thus, the continuous setting and resetting of each flip-flop corresponds to the S-bit coding intended for each bit stream. The flip-flop outputs are sampled at appropriate times and these samples are delivered to the S-bit inserters for insertion of the same into the respective outgoing message bit streams.

It should be clear at this point that the principles of the present invention are of general applicability and are in no way limited to the particular message bit stream format shown. For example, while the S-characters have been assumed for illustrative purposes to comprise four S-bits, the instant invention is quite obviously not limited thereto.

Accordingly, it is to be understood that the foregoing disclosure relates to only prefered embodiments of the invention and numerous modifications and alterations may be made therein without departing from the spirit and scope of the invention.

What is claimed is:

1. In a time division switching system having a plurality of incoming time division multiplexed message bit streams that include supervisory signal bits at uniformly spaced positions in each frame which form unique S-characters, a supervisory signal assembler comprising a delay line and a shift register connected end to end in a loop configuration, the total loop delay being equal to the time duration between successive signal bits in each message bit stream ±1 bit spacing in the delay loop, means for sequentially and cyclically scanning the message bit streams for signal bits and delivering samples thereof to the input of said delay loop, and means for reading assembled S-characters out of the delay loop after the last signal bit of each S-character has been inserted therein.

2. A supervisory signal assembler as defined in claim 1 including means for preventing the aforementioned read out of S-characters except in response to a change in the coding of the same.

3. In a time division switching system having a plurality of incoming time division multiplexed message bit streams that include supervisory signal bits at uniformly spaced positions in each frame which form unique S-characters, a supervisory signal assembler comprising a delay line and a shift register connected end to end in a loop configuration, the total loop delay being equal to the time duration between successive signal bits in each message bit stream less one delay loop bit spacing, means for sequentially and cyclically scanning the message bit streams for signal bits and delivering samples thereof to the input of said shift register, and means for reading assembled S-characters out of the shift register after the last signal bit of each S-character has been inserted into the register.

4. In a time division switching system having a plurality of outgoing time division multiplexed message bit streams which include supervisory signal bit positions uniformly spaced in each frame, a supervisory signal distributor for distributing unique S-characters as signal bits to respective message bit streams, said distributor comprising a delay line and a shift register connected end to end in a loop configuration, the total loop delay being equal to the time duration between successive signal bit positions in each message bit stream ±1 bit spacing in the delay loop, means for inserting S-characters into said delay loop, means for sampling the output of the delay loop at a predetermined uniform rate, and means for sequentially and cyclically routing the sampled signals to temporary storage means associated with each of the aforementioned message bit streams.

5. In a time division switching system having a plurality of incoming time division multiplexed message bit streams that include supervisory signal bits at uniformly spaced positions in each frame which form unique S-characters and a plurality of outgoing multiplexed message bit streams including supervisory signal bit positions similarly uniformly spaced in each frame, a supervisory signal assembler and distributor combination therefor, said signal assembler and distributor each comprising a delay line and a shift register connected end to end in a loop configuration, the total delay of each loop being equal to the time duration between successive signal bit positions in each message bit stream ±1 delay loop bit spacing, means for sequentially and cyclically scanning the incoming message bit streams for signal bits and delivering samples thereof to the input of the assembler delay loop, means for reading assembled S-characters out of the assembler delay loop after the last signal bit of each S-character has been inserted therein, means for inserting S-characters into the distributor delay loop, means for sampling the output of the distributor delay loop at a predetermined uniform rate, and means for sequentially and cyclically routing the latter sampled signals to temporary storage means associated with each of the aforementioned outgoing message bit streams.

6. A data processing system for assembling into S-characters the supervisory signal bits that are uniformly spaced in each frame of a plurality of incoming time separated message bit streams, comprising a shift register and a delay line connected end to end in a loop configuration, means for sequentially and cyclically scanning the incoming message bit streams for supervisory signal bits and delivering samples thereof to the input of said shift register, means for shifting the sampled bits in said register at a rate which is a predetermined multiple of the the rate of sampling, the length of said delay line being such as to cause the sampled bits which circulate around the delay loop to precess one delay loop bit position for each circulation, and means for reading assembled S-characters out of the shift register immediately after the last sampled signal bit of each S-character has been inserted therein.

7. A data processing system as defined in claim 6 wherein the shift register comprises a number of stages equal in number to the number of signal bits forming the S-characters.

8. A data processing system as defined in claim 7 wherein the assembled signal bits forming the S-characters are read out of the shift register in parallel form.

9. A data processing system as defined in claim 6 including means for inhibiting the reintroduction into the shift register of a circulating sampled signal bit during the insertion into the latter of a newly sampled signal bit.

10. A data processing system as defined in claim 6 including means for inhibiting the aforementioned read out of S-characters except in response to a change in the coding of the same.

11. A data processing system for distributing the supervisory signal bits of a plurality of unique S-characters to respective outgoing time separated message bit streams, comprising a shift register and a delay line connected end to end in a loop configuration, said shift register has a number of stages equal in number to the number of signal bits forming the S-characters, means for inserting the S-characters into said shift register in parallel form, means for successively applying shift pulses to said register to shift the signal bits stored therein, the length of said delay line being such as to cause the signal bits which circulate around the delay loop to precess one delay loop bit position for each circulation, means for sampling the output of the shift register at a predetermined rate which is a submultiple of and synchronous with the shift rate of the register, and means for sequentially and cyclically routing the sampled signal bits to temporary storage means which are respectively associated with each of the aforementioned message bit streams.

12. A data processing system as defined in claim 11 including means for inhibiting the insertion into the delay line of a circulating signal bit during the sampling of the output of the shift register to thus terminate the circulation of the signal bit.

No references cited.